United States Patent [19]

Lloyd

[11] 4,308,704
[45] Jan. 5, 1982

[54] TRIM MOLDING

[76] Inventor: Ralph E. Lloyd, 3750 Atlanta Hwy., Athens, Ga. 30601

[21] Appl. No.: 101,438

[22] Filed: Dec. 10, 1979

[51] Int. Cl.³ .................... E04C 2/38; E04F 19/02; B60R 13/00
[52] U.S. Cl. .................... 52/716; 296/210; 428/31; 428/99; 428/133
[58] Field of Search .............. 296/120 A, 122, 131, 296/210, 224; 24/205, 20 EE, 24, 73 PC, 73 HR, 73 BC, 132 AA, 248 B; 428/12, 31, 99, 33, 129, 133; 52/716; 293/126, 128

[56] References Cited

U.S. PATENT DOCUMENTS

| | | |
|---|---|---|
| 1,924,382 | 8/1933 | Schemmel ............................ 52/716 |
| 2,226,354 | 12/1940 | Barr ...................................... 52/716 |
| 2,284,422 | 5/1942 | Hall ...................................... 52/716 |
| 2,709,621 | 5/1955 | Votypka et al. . |
| 2,759,760 | 8/1956 | Omlie . |
| 2,784,476 | 3/1957 | Bengdal . |
| 2,947,055 | 8/1960 | McHenry . |
| 3,372,954 | 3/1968 | de Castelet . |
| 3,683,993 | 8/1972 | Perks . |
| 3,970,343 | 7/1976 | Horn . |
| 4,131,970 | 1/1979 | LeVan . |
| 4,184,297 | 1/1980 | Casamayor .......................... 52/716 |

Primary Examiner—William R. Dixon, Jr.
Attorney, Agent, or Firm—Jones, Thomas & Askew

[57] ABSTRACT

A trim molding including an integral elongate member of a flexible material formed so as to have a base portion to be attached to a surface, such as the surface of an automobile body at the edge of a vinyl covering, a cover portion for hiding the base portion and the fasteners securing the base portion to the surface, and a hinge portion permitting the cover portion to be folded to a position covering the base portion. The base portion can include an integral snap receiving recess so that a snap means formed in the cover portion can be snapped onto the base portion when the cover portion is folded in to a closed position.

7 Claims, 3 Drawing Figures

U.S. Patent     Jan. 5, 1982     4,308,704
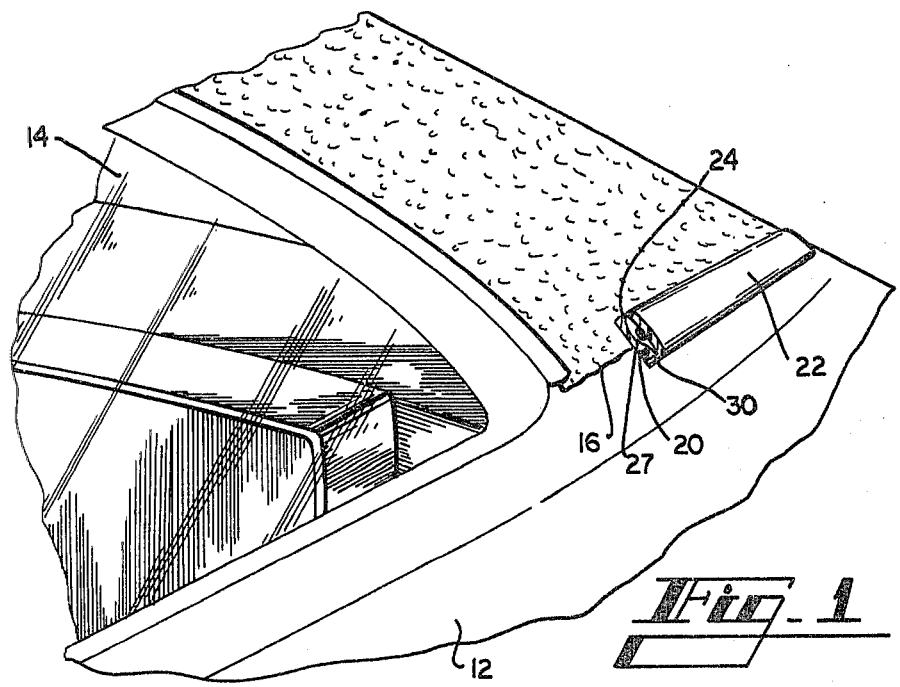
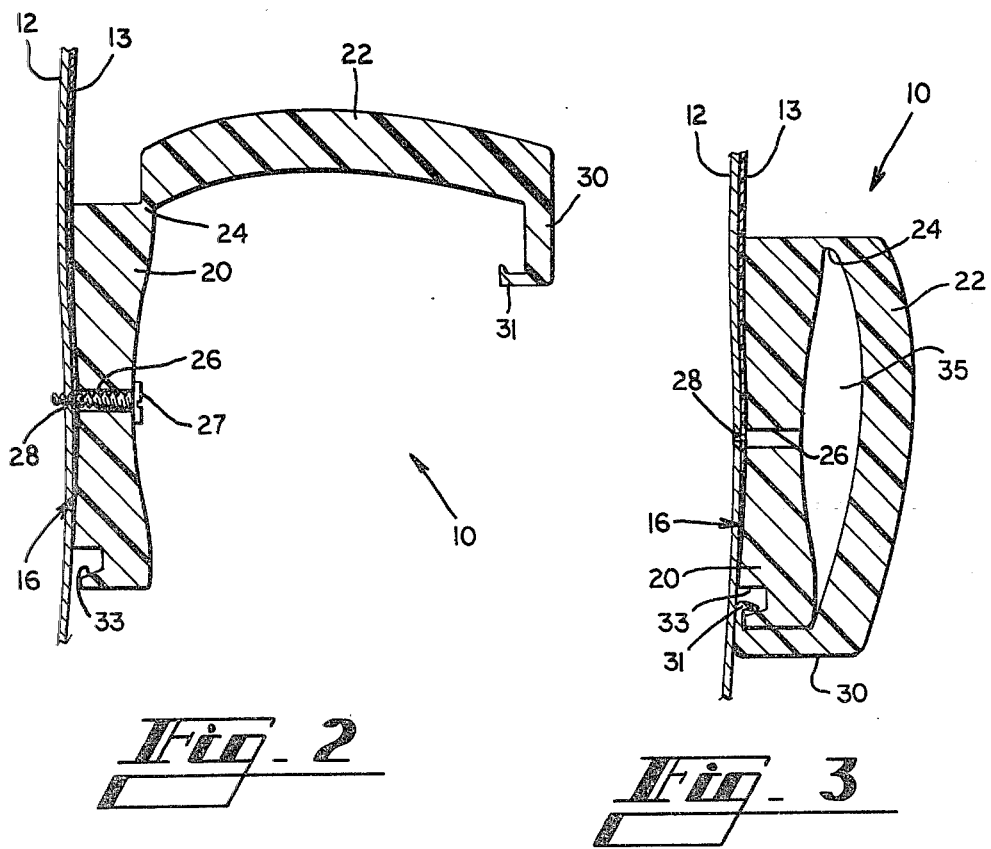

TRIM MOLDING

TECHNICAL FIELD

The present invention relates generally to decorative trim molding of the type installed on automobile bodies to hide and secure the edge of thin vinyl material applied to the roof of such automobile bodies, and more particularly relates to a one-piece flexible molding.

BACKGROUND ART

In recent years the vinyl roof has become very popular among automobile owners. In order to provide this effect, a thin sheet of vinyl material is attached to the sheet metal surface of the roof of the automobile body with an adhesive. It has been necessary to apply a trim molding strip overlapping the edges of the vinyl material to provide a satisfactory appearance and to assure that the edge of the vinyl material will not peel away from the automobile body as a result of wear and tear. A typical location at which vinyl material applied to an automobile roof terminates is the region between the rear side window and the forward portion of the trunk. The trim molding applied to this area is often called the "landau" molding.

In the past, trim moldings of the type described above have been applied to the automobile using a two-part system generally comprising an underlying mounting member or a plurality of clips and an outer decorative strip that is designed to snap or slide over the mounting member. Installation of such prior art trim molding requires the installer to first attach the mounting member or members to the metal of the automobile body and then to assemble the outer trim onto the mounting members. Thus, the prior art trim moldings have been expensive and inefficient both in terms of material costs and labor costs.

SUMMARY OF THE INVENTION

The trim molding of the present invention solves the problems of prior art trim moldings by providing an integral molding that is inexpensive to manufacture, easy to install, and accomplishes the functions of both the mounting and decorative members of prior art two-piece systems.

Generally described, a trim molding according to the present invention comprises an elongate base member, an elongate cover member extending parallel to the base member, and an elongate hinge member connecting the base member to the cover member. The hinge member permits the cover member to be folded into a position obscuring the base member and to be fastened to the base member in such position.

The trim molding of the invention preferably comprises an integral elongate member of a flexible material, including a base portion, a cover portion and a hinge portion connecting the base portion and the cover portion and permiting the cover portion to be folded over the base portion. In installation of the trim molding, the base portion is first connected to the automobile body using fastening means, and then the cover portion is folded over the base portion to obscure the base portion and the fastening means. The integral elongate member can include a means for connecting the cover portion to the base portion, and this connecting means can be a snap member integrally formed as part of the cover portion and a snap receiving means integrally formed in the base portion. The latter feature permits selective closure of the cover portion over the base portion, and permits the trim molding to be easily removed from the automobile by unfastening the snap closure and removing the fastening means without damage to the vinyl roof material or the paint on the automobile body. Thus, the trim molding can be easily removed and replaced to permit repair of the vinyl roof or replacement of the trim molding.

Thus, it is an object of the present invention to provide a one piece trim molding that obscures the means used to fasten the molding to a surface.

It is a further object of the present invention to provide an integral flexible trim molding including two portions that fold over one another to hide a fastening means connecting one of the portions to a surface.

It is a further object of the present invention to provide an improved trim molding for the edge of vinyl material applied to the roof of an automobile.

It is a further object of the present invention to provide a trim molding that can be easily removed from a surface and replaced thereon without damaging the surface.

Further objects, features and advantages of the present invention will become apparent upon a review of the following specification, when taken in conjunction with the appended drawing.

BRIEF DESCRIPTION OF THE DRAWING

FIG. 1 is a partial view of an automobile showing a trim molding strip embodying the present invention, with a portion of the trim molding broken away.

FIG. 2 is a cross sectional view of a trim molding strip embodying the present invention attached to an automobile body and shown in an open position.

FIG. 3 is a cross sectional view of the trim molding shown in FIG. 2, shown in a closed position.

DETAILED DESCRIPTION

Referring now to the drawing, in which like numerals refer to like parts throughout the several views, FIG. 1 shows a trim molding 10 embodying the present invention installed as a landau molding on an automobile body 12 near the rear side window 14 of the automobile. A vinyl covering 13 has been fixed to the body 12, and terminates in an approximately horizontal edge 16. It will be seen that the molding 10 is installed so as to overlap the edge 16 of the vinyl covering 13, hide the rough edge, and protect the edge from being pulled loose from the body 12.

The construction of the trim molding 10 is best seen in FIGS. 2 and 3. In the preferred embodiment shown, the trim molding 10 comprises an integral plastic extrusion of polyvinyl choride. It will be understood that any suitable flexible plastic or other material can be used to form the trim molding 10. The trim molding 10 includes an elongate base portion 20, an elongate cover portion 22, and an integral hinge portion 24 connecting the base portion 20 to the cover portion 22. The hinge portion 24 has a thickness substantially less than the base and cover portions, so that the trim molding 10 can be bent or folded about the hinge portion 24. For a typical automobile installation, the base and cover portions can be 3–4 mm in thickness, and the hinge portion can be about 1 mm in thickness.

A lip 30 is integrally formed as part of the cover portion 22 at the side of the cover portion 22 opposite the hinge portion 24. The lip 30 ends in a hook member 31 to form a snap closure means. The base portion 20 includes an integrally formed recess 33 for receiving the hook member 31, the recess 33 thus providing a snap receiving means to receive and retain the hook member 31 when the cover member is folded about the hinge portion 24 to a closed position as shown in FIG. 3.

A plurality of fastener receiving openings 26 are provided in the base portion 20 at spaced apart intervals along the base member 20. The openings 26 receive fasteners such as sheet metal screws 27 which are screwed into holes 28 through the vinyl 13 and the automobile body 12, as shown in FIG. 2.

In order to install a trim molding according to the present invention, the holes 28 are first drilled in the automobile body 12 in alignment with the fastening openings 26 in the base portion 20 of the trim molding 10. Alternately, the fastener openings 26 can be omitted from the base portion 20 and the fastener openings 26 and the holes 28 can be drilled simultaneously while the base member 20 is held in position against the body 12. Next, fasteners such as sheet metal screws 27 are utilized to connect the base portion 20 of the trim molding 10 to the automobile body 12 in a position overlapping the edge 16 of the vinyl covering 13. Thereafter, the cover portion 22 is simply bent downwardly about the hinge portion 24 until the hook member 31 is snapped into the recess 33 in the base member 20. It will be seen that the fasteners 27 are within a channel 35 formed when the cover portion 22 is in a closed position, as in FIG. 3. The fasteners 27 and the base member 20 are completely shielded from view by the cover portion 22 and its lip 30.

If it is necessary to remove the trim molding, there is no requirement that a trim piece be pried off mounting clips as was necessary in some prior art systems. The hook member 31 can be readily unsnapped from the recess 33, for example, by inserting a screwdriver into the channel 35 at one end of the molding 10 and prying the hook 31 out of the recess 33 without damaging the surrounding surface. This exposes the fasteners 27 for easy removal.

It will thus be seen that a trim molding strip according to the present invention provides a one-piece molding that can be inexpensively manufactured and efficiently installed to provide a highly pleasing finished appearance.

While this invention has been described in detail with particular reference to preferred embodiments thereof, it will be understood that variations and modifications can be effected within the spirit and scope of the invention as described hereinbefore and as defined in the appended claims.

I claim:

1. A trim molding for attachment to a surface to cover an elongate peripheral edge comprising:
    an elongate base member;
    an elongate cover member corresponding in length to said peripheral edge;
    snap means depending from said cover member comprising an outside lip and a resilient snap member extending inwardly from said lip;
    snap receiving means defined in said base member comprising a recess in said base member and a resilient snap receiving member within said recess;
    an elongate hinge member connecting said cover member to said base member so as to permit said cover member to pivot about said hinge member and to fold over said base member, thereby allowing said resilient snap member of said snap means to releasably engage said resilient snap receiving means within said recess.

2. The article of claim 1, wherein said elongate base member and said elongate cover member are of approximately the same width, and said cover member obscures from view one side of said base member and said snap receiving means when said snap means is engaged with said snap receiving means.

3. The article of claim 2 wherein said cover member, said snap means, said base member, said hinge member, and said snap receiving means comprise integrally extruded resilient material.

4. The article of claim 3 wherein said base member defines openings therein for receiving mounting fasteners for attachment of said base member to a supporting surface.

5. The article of claim 1 wherein said snap means extends from said cover member to meet said surface when said snap means engages said snap receiving means.

6. The article of claim 5 wherein said surface forms a boundary of said recess defined in said base member.

7. The article of claim 3 wherein said integrally formed snap receiving means comprises an elongate recess extending along said base member adjacent to an edge of said base member spaced apart from said hinge member; and wherein said integrally formed snap means depends from an edge of said cover member spaced apart from said hinge member, said recess receiving and retaining said snap means when said cover member is folded against said base member.

* * * * *